April 6, 1948.                D. R. CROSBY                2,439,286
                          OSCILLATION GENERATOR
                          Filed Feb. 16, 1944
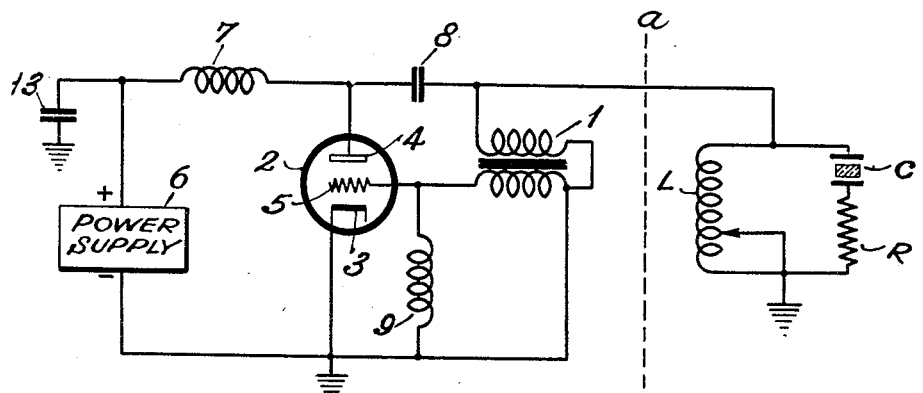
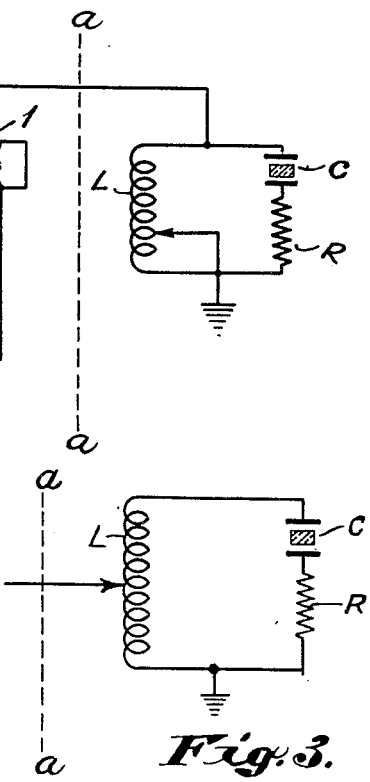
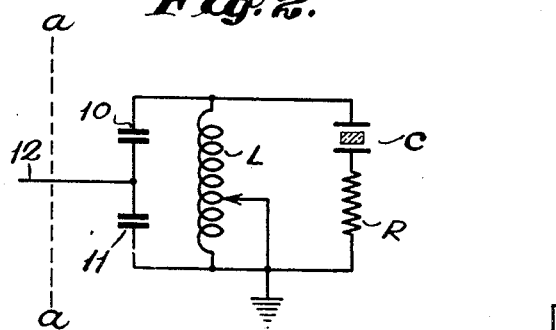
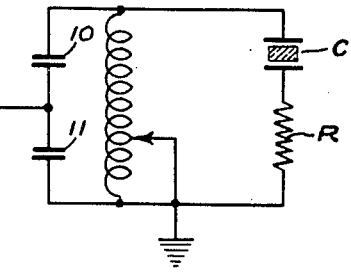
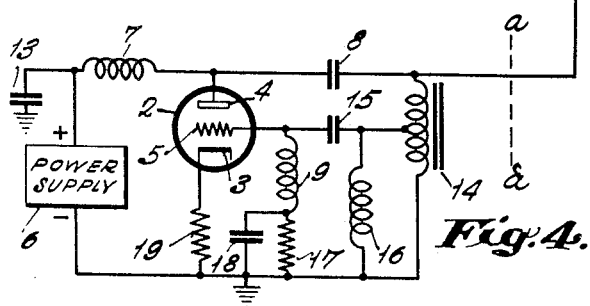
INVENTOR.
David R. Crosby
BY
H. S. Grover
ATTORNEY Patented Apr. 6, 1948

2,439,286

UNITED STATES PATENT OFFICE 2,439,286

OSCILLATION GENERATOR

David Rogers Crosby, Haddonfield, N. J., assignor to Radio Corporation of America, a corporation of Delaware Application February 16, 1944, Serial No. 522,589

9 Claims. (Cl. 250—36)

This invention relates to oscillation generators and has particularly to do with the improvement of oscillator circuits which are designed primarily for heating purposes.

It is an object of my invention to provide means for readily adjusting the parameters of a high power oscillator so as to obtain the optimum efficiency of operation over a wide range of loading conditions.

It is another object of my invention to provide means in an oscillation generator whereby the feedback to the grid of the discharge tube shall be rendered substantially independent of the load, so as to produce a favorable phase shift and amplitude in the feedback circuit at all times.

My invention is described in detail by reference to the accompanying drawing, in which:

Fig. 1 shows a preferred circuit arrangement;

Fig. 2 shows a modification of that part of the circuit of Fig. 1 which lies to the right of a reference line $a$—$a$;

Fig. 3 shows another modification of the complete circuit arrangement of Fig. 1, particularly with reference to the portion thereof to the right of the line $a$—$a$; and Fig. 4 shows how the circuit of Fig. 1 may be improved in its operation by the addition of certain favorable components.

It is conventional to provide an oscillation generator having a single tuned anode circuit. Feedback potentials are derived from some portion of the output circuit which is suitably selected for obtaining the proper phase and amplitude of grid potential. In the use of my oscillation generator for heating one must allow for wide variations in the frequency of oscillations generated. It is important, also, that the generator be rendered efficiently operable under widely variable load conditions. These variations ordinarily produce wide differences in the phase displacement and amplitude of the grid potentials with respect to the anode potentials. In order to overcome this difficulty, I preferably employ an independent feedback circuit which comprises an iron core transformer 1 as shown in Fig. 1.

The discharge tube 2 may, if desired, be a simple triode having a cathode 3, an anode 4, and a control grid 5. The cathode 3 may, if desired, be grounded and should also be connected to the negative terminal of a suitable direct current power supply source 6. The positive terminal of this source is connected through an inductive choke 7 to the anode 4. The bypass condenser 13 is in shunt with the power supply unit 6.

The load may consist of a capacitor C having in series therewith a resistor R, and both C and R form one branch of a parallel-tuned circuit, the other branch of which comprises the variable inductance L. Capacitor C may be, and usually is, in the form of a dielectric material to be heated, this material being disposed between two electrode plates.

A blocking condenser 8 is used to couple the resonant load circuit to the anode 4. The feedback circuit to the grid 5 is fed with energy from the output circuit by the mutual inductance between the two windings of the transformer 1.

A suitable choke 9 is preferably connected between the grid 5 and ground in place of the usual grid leak resistor. In another embodiment of my invention as shown in Fig. 4, the choke is series-connected to a grid leak resistor, as will be hereinafter explained.

In the operation of the circuit arrangement as shown in Fig. 1, it will be seen that the iron core transformer 1 serves to properly shift the phase of the voltage applied to the grid 5. This phase shift is not materially influenced by load variations. Furthermore, the amplitude of the feedback potentials, when adjusted to a desired value, is automatically maintained constant. In the tuned circuit which includes the elements L, C, and R, adjustments can readily be made to satisfy the conditions for optimum efficiency of output from the generator, despite wide variations in the load. When the element C includes dielectric material to be heated, the capacity tends to decrease as the heat increases. It often occurs that the capacitance drops as much as 50% during the heating process. Since the frequency depends upon the formula $$F = \frac{1}{2\pi\sqrt{LC}}$$

it will be readily understood that wide variations would occur in the phase angle and amplitude of the feedback potential applied to the grid except for the fact that the feedback circuit is made independent of the conditions existing in the resonant circuit.

Referring now to the choke element 9, it may be said in favor of this device that it tends to neutralize a certain amount of capacitive reactance. The stray capacity on the output of the transformer 1 and the input capacity of the tube tend to load the transformer so as to produce an unfavorable phase shift in the grid voltage.

Choke 9 operates to neutralize this effect and to maintain the grid voltage in proper phase.

In Fig. 2 I show a modification wherein the tuned circuit $$\frac{L}{RC}$$

is coupled to the output from the tube 2 by means of capacitors 10 and 11. Conductor 12, which is connected to the junction between these two capacitors, may be the same as that which crosses the reference line $a$—$a$ in Fig. 1, or it may be directly connected to the anode 4 of tube 2. Since one of the electrodes of capacitor 11 is grounded, voltage variations will be produced on the free electrode of capacitor 10, such as to excite the resonant circuit. Elements L, C, and R are disposed in the same relationship for producing resonance as shown and described with reference to Fig. 1. Fig. 2, therefore, needs no further description.

Referring to Fig. 3, I show another modification wherein the resonant circuit $$\frac{L}{RC}$$

is arranged for excitation by means of an adjustable tap on the winding of the inductance L. The position of this tap can be suitably varied for optimum results.

Another modification of my invention is shown in Fig. 4 wherein that part to the left of the dashed line $a$—$a$ should be considered an alternative circuit arrangement for that part of Fig. 1 also lying to the left of the dividing line $a$—$a$. Like parts are given like reference numbers.

The transformer 14 is in effect one which has its two windings series-connected between the output circuit and ground and is separated from the anode 4 by the coupling capacitor 8. The grid 5 is coupled to a tap on the transformer 14 by means of capacitor 15. In order to facilitate adjustment of the phase of the feedback potentials without shifting the position of the tap on transformer 14, it is desirable to utilize an inductance 16 in shunting relation to one winding of the transformer 14. The correct amount of inductance in element 16 may easily be found by substituting one element for another of different value until the operation becomes satisfactory.

The choke 9, which may be the same as this element in Fig. 1, is shown in Fig. 4 connected in series with a grid leak resistor 17. The grid leak resistor is conventionally shunted by capacitor 18. The grid bias is largely determined, however, by the potential drop which occurs in the cathode resistor 19 connected between the cathode 3 and ground. With this arrangement it will be seen that the direct current components in the input circuit may be adjusted to any desired value and, furthermore, the phase of the alternating feedback potentials is also made readily adjustable by means of the choke 16.

In a physical embodiment of my invention, where an RCA type 810 tube was used, it was found that the value of R could readily be varied between 8 and 58 ohms, and that the frequency of the oscillations generated could be varied between 1.2 and 4 megacycles with plate efficiencies running as high as 69%. The output was as much as 128 watts when the grid current was measured at 185 milliamperes. Under these conditions, the plate efficiency was 46%. These values for useful output and grid current were, however, obtained without the aid of the neutralizing choke or grid phasing coil 9. When this choke was introduced, the output dropped to 123 watts, but the grid current was only 138 milliamperes, thus giving an efficiency of 52%.

Various modifications of my invention may, of course, be made by those skilled in the art without departing from the spirit and scope of the invention itself.

I claim:

1. An oscillation generator comprising a discharge tube having a cathode, an anode and a control grid, a power supply source of polarizing voltage connected in series with a choke between the cathode and the anode, a resonant circuit having one terminal coupled to the junction between said anode and said choke, the other terminal of said resonant circuit being connected to the cathode, an input circuit connected between the cathode and control grid, means including an iron core transformer and a grid phasing coil in circuit therewith for applying suitably phased feedback potentials to said input circuit from said resonant circuit, and means for avoiding the flow of direct current to said anode through said resonant circuit, to thereby cause oscillation over a wide range of loading conditions.

2. In a device for applying heat to a load, an oscillation generator comprising a discharge tube the space path of which is fed with direct current from a power source, a control grid in said tube having an impedance in its input circuit to the cathode, at least a portion of said impedance being inductive, an inductive coupling means including a coil connected between the input and the output circuits of said tube for supplying feedback potentials to said grid, said coil having a core of magnetic material, an air cored choke coil in shunt with a portion of the coil of said inductive coupling means, and a frequency determining circuit coupled between the anode and cathode of said tube, the last said circuit being constituted as an inductance in parallel with a capacitor.

3. In a device for applying heat to the dielectric material of a capacitor, an oscillation generator comprising a discharge tube having a cathode, an anode and a control grid, a resonant circuit capacitively coupled to said anode, said circuit including an inductance in parallel with said capacitor, a source of direct current for energizing the electrodes of said tube, the coupling of said resonant circuit being non-conductive of direct current, a feedback circuit for transferring excitation potential from said anode to said grid, said feedback circuit including phase-shifting means having an iron-core transformer and an air-core inductance in shunt with at least a portion of the transformer winding, and means including a cathode resistor for maintaining a suitable D. C. bias on said grid.

4. An oscillation generator according to claim 3 and including a series-capacitive shunt across the terminals of said resonant circuit, and a conductor connecting the anode of said tube to the junction between two capacitive elements of said shunt.

5. An oscillation generator according to claim 3 and including a tap on the inductance of said resonant circuit whereby the flow of alternating currents between said resonant circuit and said tube is effected.

6. An oscillation generator according to claim 3 and including an inductive impedance interposed between the positive terminal of said direct current source and said anode.

7. In a device for applying heat to a dielectric, an oscillation generator comprising an electron discharge tube having cathode, anode and grid electrodes, grid and anode circuits for said tube, feedback coupling means between said grid and anode circuits, said means including a magnetic material cored coil and a grid phasing coil in circuit therewith for transforming anode circuit energy into phase-displaced grid circuit potentials, a frequency determining circuit connected between the anode and cathode of said tube, said frequency determining circuit comprising an inductance in circuit with a capacitor, a direct current source suitably connected to the cathode and anode of said tube for supplying polarizing potential to said anode, a D. C. blocking condenser connected between said anode and said frequency determining circuit, said blocking condenser being so arranged as to prevent said anode polarizing potential from reaching said feedback coupling means and said frequency determining circuit.

8. In a device for applying heat to the dielectric material of a capacitor, an oscillation generator comprising a discharge tube having a cathode, an anode and a control grid, a resonant circuit capacitively coupled to said anode, said circuit including an inductance in parallel with the series circuit of a resistor and said capacitor, a connection from one terminal of said resonant circuit to ground, a source of direct current for energizing the electrodes of said tube, the coupling of said resonant circuit being non-conductive of direct current, a feedback circuit for transferring excitation potential from said anode to said grid, said feedback circuit including phase-shifting means having an iron-core transformer and an inductance in shunt with at least a portion of the transformer winding, to thereby produce a feedback of such phase as to cause oscillation over a wide range of loading conditions.

9. In a device for applying heat to the dielectric material of a capacitor, an oscillation generator comprising a discharge tube having a cathode, an anode and a control grid, a resonant circuit capacitively coupled to said anode, said circuit including an inductance in parallel with the series circuit of a resistor and said capacitor, a direct current connection from the junction of said inductance and resistor to ground, a source of direct current for energizing the electrodes of said tube, the coupling of said resonant circuit being non-conductive of direct current, a feedback circuit for transferring excitation potential from said anode to said grid, said feedback circuit including phase-shifting means having an iron-core transformer and an inductance in shunt with at least a portion of the transformer winding, to thereby produce a feedback of such phase as to cause oscillation in a frequency range of the order of one to four megacycles.

DAVID ROGERS CROSBY.

REFERENCES CITED

The following references are of record in the file of this patent:

UNITED STATES PATENTS

| Number | Name | Date |
|---|---|---|
| 2,049,777 | Mountjoy | Aug. 4, 1936 |
| 2,100,756 | Shepard, Jr. | Nov. 30, 1927 |
| 2,145,124 | Mead, Jr. | Jan. 24, 1939 |
| 2,165,468 | Farrington | July 11, 1939 |
| 2,179,261 | Keller | Nov. 7, 1939 |
| 2,205,233 | Slooten | June 18, 1940 |
| 2,251,277 | Hart | Aug. 5, 1941 |
| 2,258,962 | Scherer | Oct. 14, 1941 |
| 2,272,851 | Ramsay | Feb. 10, 1942 |
| 2,304,958 | Rouy | Dec. 15, 1942 |
| 2,341,120 | Rudd et al. | Feb. 8, 1944 |

FOREIGN PATENTS

| Number | Country | Date |
|---|---|---|
| 199,964 | Great Britain | July 5, 1923 |
| 254,424 | Great Britain | July 8, 1926 |
| 439,166 | Great Britain | Dec. 2, 1935 |
| 584,346 | Germany | Sept. 18, 1933 |

OTHER REFERENCES

Jordan, "Application of Vacuum Tube Oscillators to Inductive and Dielectric Heating in Industry," Electrical Engineering, Transactions, November 1942. (Copy in Scientific Library.)

Radio Handbook, 6th edition, published by Radio, Ltd., 1300 Kenwood Road, Santa Barbara, California. (Copy in Library of Congress.)

The Radio Amateur's Handbook, 1941, copyright 1940 by American Radio Relay League, Inc., West Hartford, Conn. (Copy in Library of Congress.)